US010416456B2

(12) United States Patent
Bouchier et al.

(10) Patent No.: US 10,416,456 B2
(45) Date of Patent: Sep. 17, 2019

(54) METHODS AND SYSTEMS FOR AUGMENTED REALITY

(71) Applicant: Essilor International, Charenton le Pont (FR)

(72) Inventors: Aude Bouchier, Charenton le Pont (FR); Jean-Paul Cano, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 35 days.

(21) Appl. No.: 15/740,971

(22) PCT Filed: Jun. 30, 2016

(86) PCT No.: PCT/EP2016/065403
§ 371 (c)(1),
(2) Date: Dec. 29, 2017

(87) PCT Pub. No.: WO2017/005614
PCT Pub. Date: Jan. 12, 2017

(65) Prior Publication Data
US 2018/0196265 A1 Jul. 12, 2018

(30) Foreign Application Priority Data

Jul. 3, 2015 (EP) .................................. 15306099

(51) Int. Cl.
*G02B 27/01* (2006.01)
*G02B 27/10* (2006.01)
(Continued)

(52) U.S. Cl.
CPC ....... *G02B 27/0172* (2013.01); *G02B 3/0006* (2013.01); *G02B 5/045* (2013.01); *G02B 27/0179* (2013.01); *G02B 27/1066* (2013.01);
*G02F 1/163* (2013.01); *G02B 2027/0123* (2013.01); *G02B 2027/0127* (2013.01);
(Continued)

(58) Field of Classification Search
CPC .. G02B 27/0172; G02B 3/0006; G02B 5/045; G02B 27/0179; G02B 27/1066; G02B 2027/0123; G02B 2027/0127; G02B 2027/0138; G02B 2027/0174;
(Continued)

(56) References Cited

U.S. PATENT DOCUMENTS

| 2013/0077049 A1 | 3/2013 | Bohn |
| 2014/0232651 A1 | 8/2014 | Kress et al. |
| 2014/0340389 A1 | 11/2014 | Lanman et al. |
| 2016/0216515 A1 | 7/2016 | Bouchier et al. |

FOREIGN PATENT DOCUMENTS

| CN | 104007552 A | 8/2014 |
| JP | 2010-26273 A | 2/2010 |

(Continued)

OTHER PUBLICATIONS

International Search Report dated Oct. 20, 2016 in PCT/EP2016/065403 filed Jun. 30, 2016.
Extended European Search Report dated Dec. 11, 2015 in European Application 15306099.1 filed Jul. 3, 2015.
(Continued)

*Primary Examiner* — Wen Huang
(74) *Attorney, Agent, or Firm* — Oblon, McClelland, Maier & Neustadt, L.L.P.

(57) ABSTRACT

Methods and systems for image display with a head-mounted device involve the use of a light-field display. Such a display is useful for providing augmented reality.

13 Claims, 14 Drawing Sheets

(51) Int. Cl.
*G02B 3/00* (2006.01)
*G02B 5/04* (2006.01)
*G02F 1/163* (2006.01)
*G03H 1/04* (2006.01)

(52) U.S. Cl.
CPC ............... *G02B 2027/0138* (2013.01); *G02B 2027/0174* (2013.01); *G02B 2027/0178* (2013.01); *G02B 2027/0187* (2013.01); *G03H 1/0402* (2013.01); *G03H 2001/0439* (2013.01)

(58) Field of Classification Search
CPC .... G02B 2027/0178; G02B 2027/0187; G02F 1/163; G03H 1/0402; G03H 2001/0439
USPC ............................................................ 359/13
See application file for complete search history.

(56) References Cited

FOREIGN PATENT DOCUMENTS

| WO | 01/09685 A1 | 2/2001 |
|---|---|---|
| WO | 2007/144308 A1 | 12/2007 |
| WO | 2010/010275 A2 | 1/2010 |
| WO | 2013/049012 A1 | 4/2013 |
| WO | 2014/126692 A1 | 8/2014 |
| WO | 2014/186625 A1 | 11/2014 |
| WO | 2015/032824 A1 | 3/2015 |
| WO | 2015/032828 A1 | 3/2015 |

OTHER PUBLICATIONS

Weitao Song et al., "Design of light field head-mounted display", Proceedings of SPIE, International Society for Optical Engineering, Dec. 17, 2014, vol. 9293, pp. 92930J1-92930J6, XP060044710.

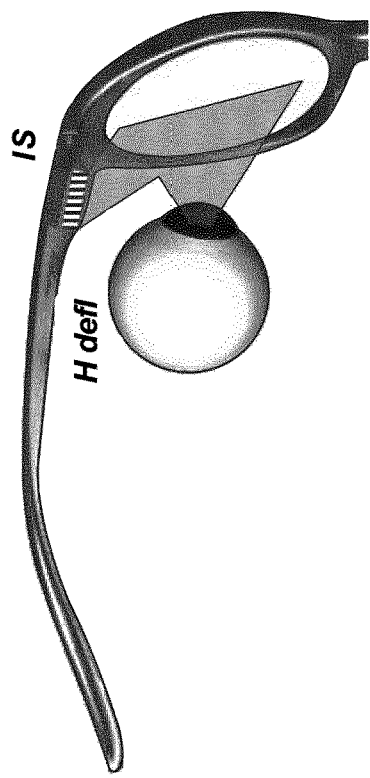
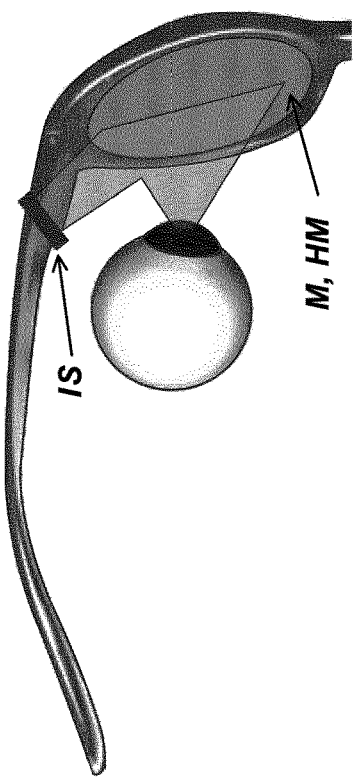
FIG. 1

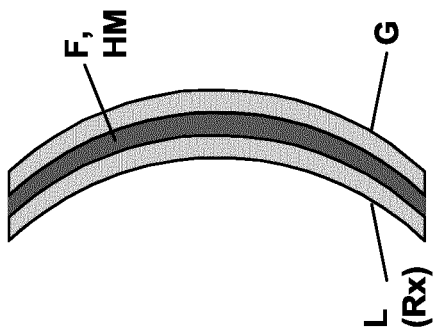
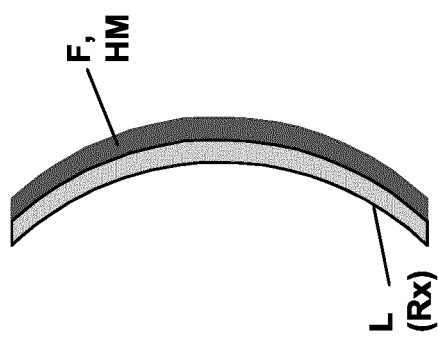
FIG. 2

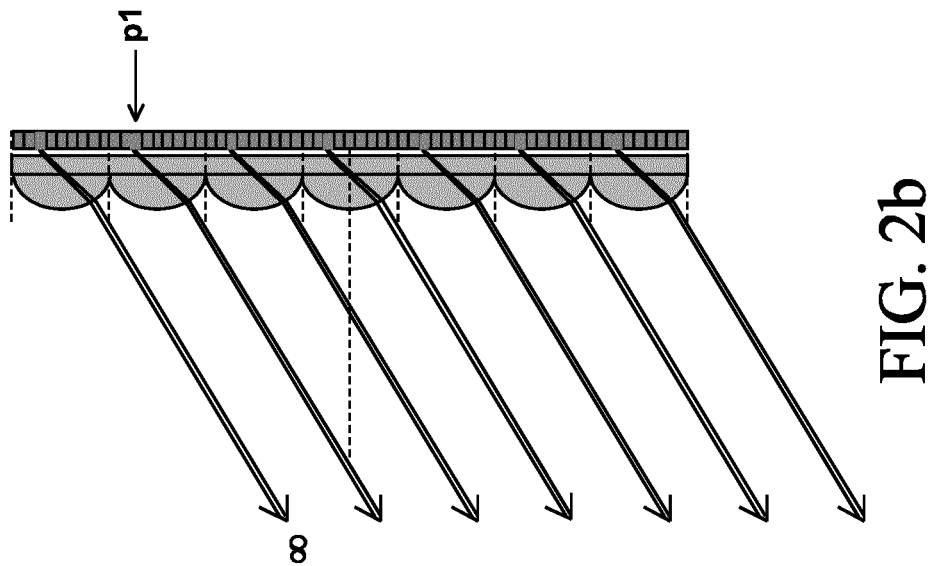
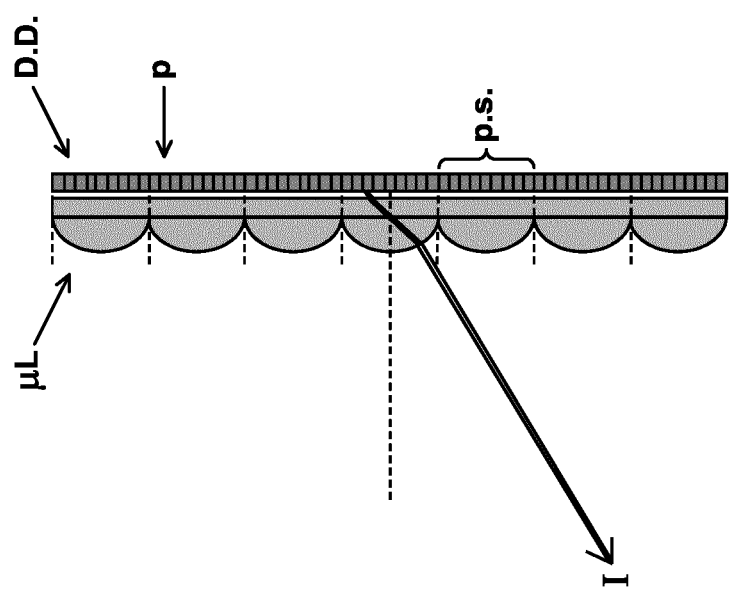

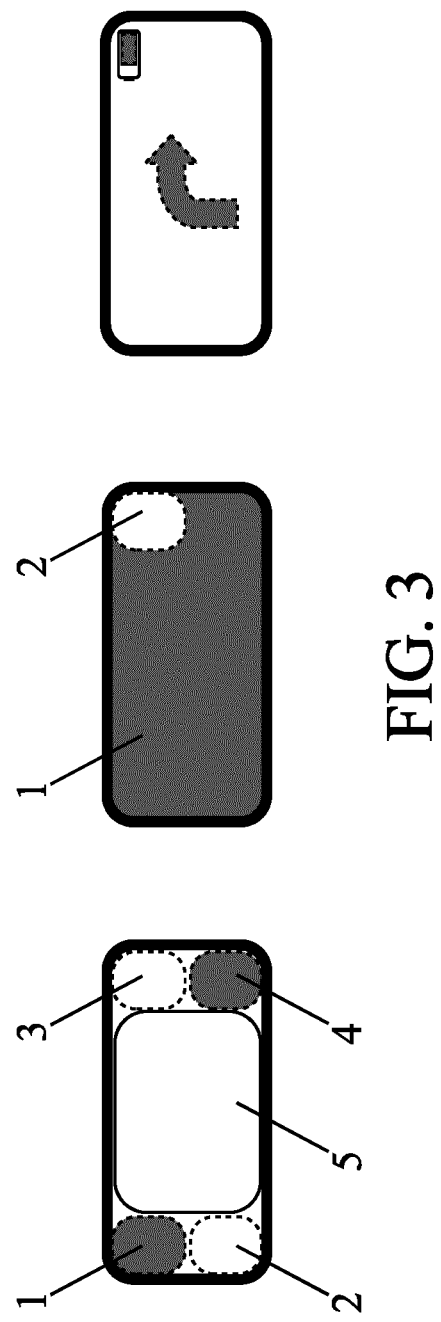

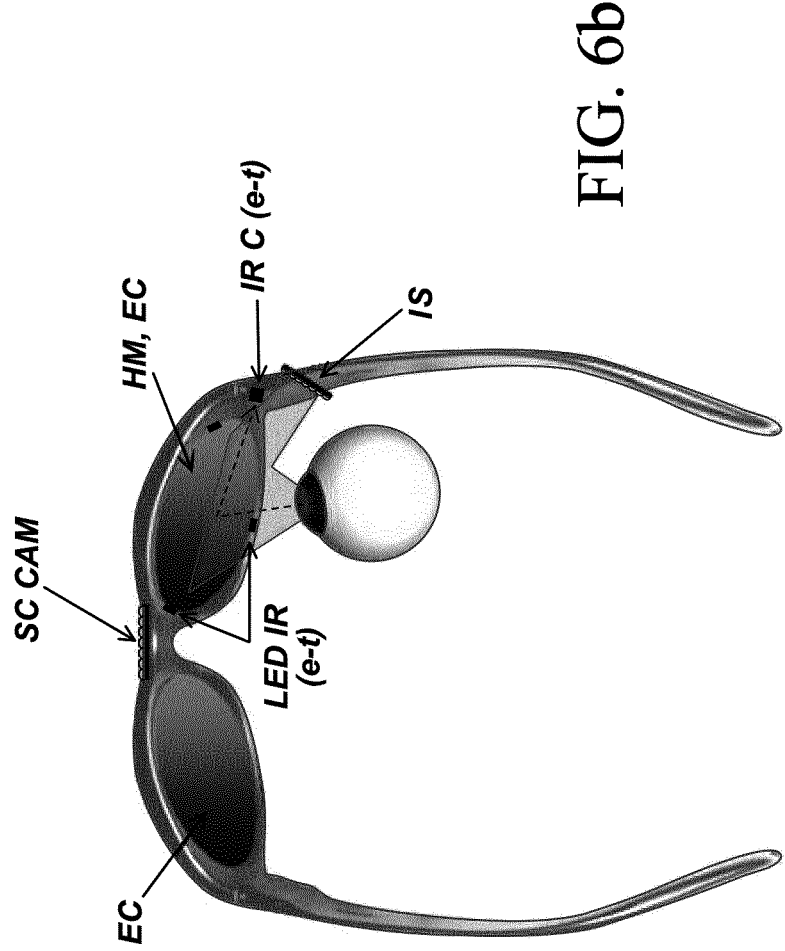
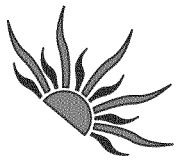
FIG. 6b

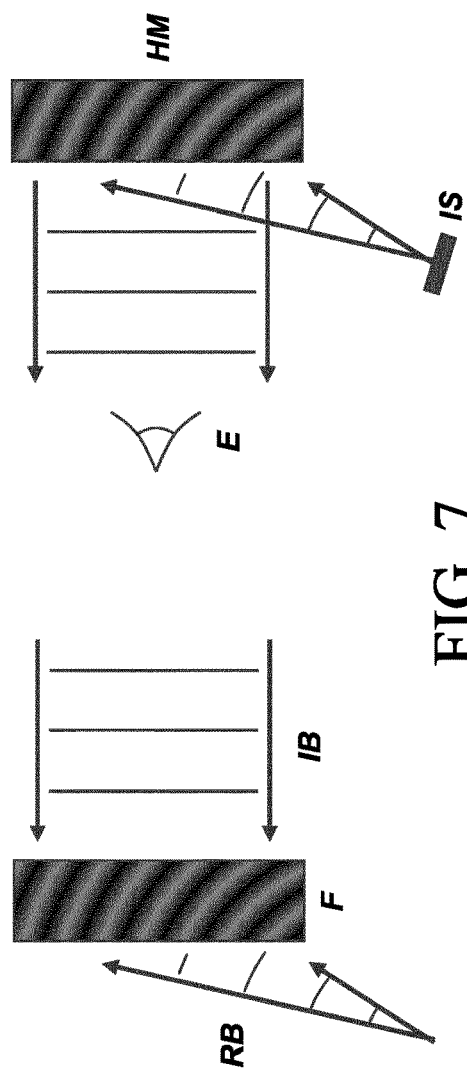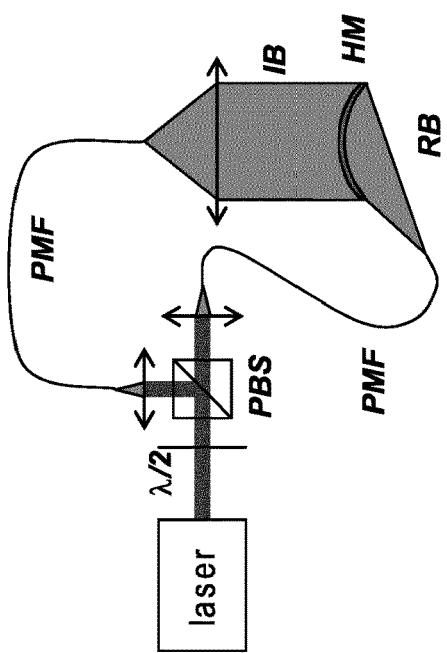
FIG. 7
FIG. 8

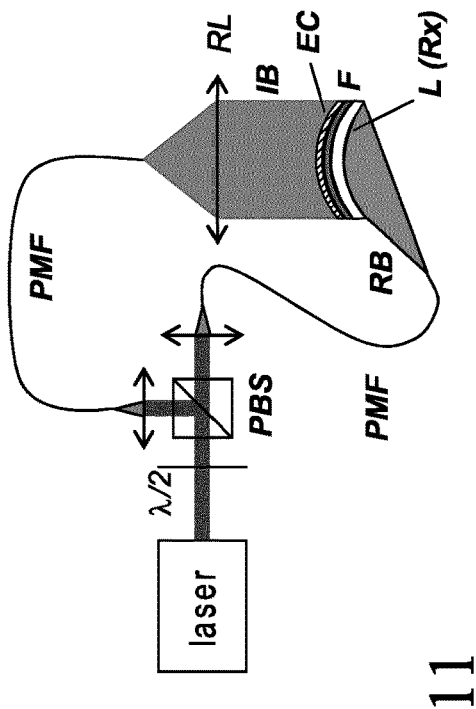
FIG. 11
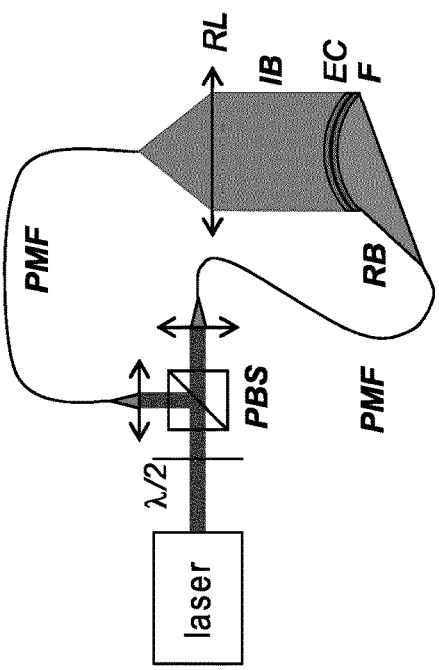
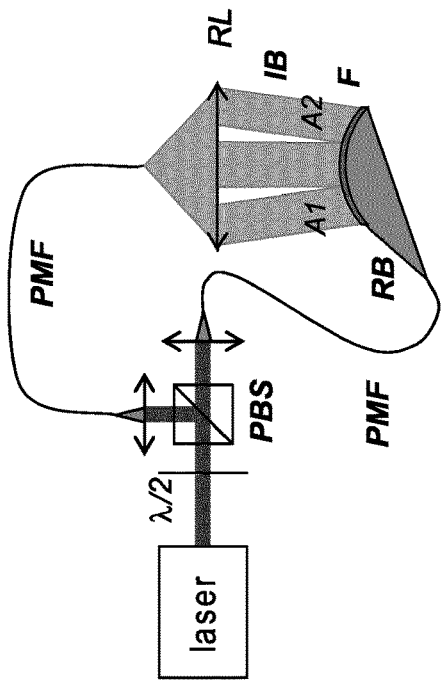
FIG. 12

METHODS AND SYSTEMS FOR AUGMENTED REALITY

FIELD OF THE INVENTION

The invention relates to methods and systems for augmented reality.

The invention relates more particularly to the display of computer-generated images.

BACKGROUND OF THE INVENTION

Head-mounted devices with display features are known in the art. Such devices include so-called 'smart glasses', which allow the wearer thereof to visualize images or text for augmented reality.

WO 2015/032824 and WO 2015/032828 disclose head-mounted devices comprising a spatial light modulator for the display of computer-generated holographic images. In order to improve wearer visual comfort, it is desirable to provide methods and systems wherein images and text are displayed in a customized way that is specifically adapted to the wearer and/or to the worn device.

Further, for experiencing actual augmented reality, it is desirable to provide methods and systems that allow tunable visualization of computer-generated images. In particular, it is desirable that the distance and/or the direction of visualization by the wearer can be customized in a dynamic, such as time-lapse, fashion. This would provide with dynamic display of images in different gaze directions, in other terms in various positions of the vision field of the wearer, and/or provide with visualization distance (focus) dynamic adjustments. It is also desirable to adjust the size and the field of view of the visualized image. Moreover, it is desirable that augmented reality be adjusted to the wearer's vision, whether in the event of an ametropic wearer or in the event of an emmetropic wearer, possibly taking account reduced accommodation capacities. Also, it is desirable to correct, at least partially, secondary aberrations such as aspherization or field aberrations.

SUMMARY OF THE INVENTION

The present invention generally provides methods and systems for image display with a head-mounted device.

In general terms, the present invention involves the use of a light-field display. Such display is useful for providing augmented reality.

Devices of the Invention

In one aspect, the present invention relates to a head-mounted device (HMD) intended to be worn by a wearer, wherein the head-mounted device is configured for the display and visualization, by the wearer, of computer-generated images, wherein said head-mounted device (HMD) comprises: an image source (IS), wherein the image source (IS) comprises a light-field display; and a see-through minor (M), such as a holographic mirror (HM) situated in front of one eye of the wearer; wherein the image source (IS) is configured for the emission of a light beam towards said mirror, wherein said emitted light beam is reflected onto said minor (M, HM) and thereby is directed towards said eye of the wearer, so as to cause visualization of a computer-generated image by the wearer.

In some embodiments, the see-through mirror and/or the image source is/are configured for adjusting at least partially the wearer's vision for the visualization of said displayed computer-generated image; for example, where the wearer is ametropic, the see-through mirror and/or the image source may be configured for correcting at least partially the wearer's ametropia for the visualization of said displayed computer-generated image. In some embodiments, the see-through minor is a holographic mirror, and the light-field display comprises: an array of optical micro-elements, wherein the optical micro-elements may be active or passive, and wherein said array of optical micro-elements is selected from arrays of micro-lenses; arrays of micro-holes; arrays of micro-prisms; arrays of liquid crystals, such as LCD or LCoS; arrays of gratings; and arrays of phase masks; and: a digital display element selected from digital display screens such as LED, OLED, LCoS, LCD and SLM display screens.

In some embodiments, the light-field display comprises: an array of optical micro-elements, and a digital display element comprising a plurality of pixels; wherein, in the array of optical micro-elements, each optical micro-element corresponds to a subset of pixels in the digital display element.

In some embodiments, all optical micro-elements in the array of optical micro-elements are identical.

In some embodiments, the array of optical micro-elements is an array of micro-lenses, wherein said array of micro-lenses comprises at least two types of micro-lenses; or an array of micro-holes, wherein said array of micro-holes comprises at least two types of micro-holes; or an array of micro-prisms, wherein said array of micro-prisms comprises at least two types of micro-prisms; or an array of liquid crystals, wherein said array of liquid crystals comprises at least two types of liquid crystals; or an arrays of gratings, wherein said array of gratings comprises at least two types of gratings; or an array of phase masks, wherein said array of phase masks comprises at least two types of phase masks.

In some embodiments, the array of optical micro-elements is an array of micro-lenses comprising at least two types of micro-lenses, wherein said at least two types of micro-lenses differ by one or more of the following: micro-lens diameter, micro-lens optical power, micro-lens profile for example selected from spherical, aspherical, cylindrical, biconvex, plano-convex, concave, plano-concave, biconcave, with positive meniscus, negative meniscus, etc., relative distance from the micro-lens to its respective subset of pixels in the digital display element, active or passive nature of the micro-lens.

In some embodiments, the array of optical micro-elements is an array of micro-holes comprising at least two types of micro-holes, wherein said at least two types of micro-holes differ by one or more of the following: micro-hole dimension, such as diameter; micro-hole shape; relative distance from the micro-hole to its respective subset of pixels in the digital display element.

In some embodiments, the at least two types of optical micro-elements (said at least two types of micro-lenses, respectively said at least two types of micro-holes, respectively said at least two types of micro-prisms, respectively said at least two types of liquid crystals, respectively said at least two types of gratings, respectively said at least two types of phase masks) are arranged with a light source of said image source which emits said light beam so as to define at least two different areas in the array of optical micro-elements.

In some embodiments, the head-mounted device (HMD) further comprises at least one sensor selected from: one or more scene cameras; one or more luminance sensors and luminosity sensors; and one or more eye-trackers.

Uses and Methods of the Invention

In one aspect, the present invention relates to a use of a light-field display in a see-through head-mounted device intended to be worn by a wearer, wherein said head-mounted device comprises a mirror, and wherein said light-field display is configured for the emission of a light beam towards said mirror, wherein said emitted light beam is reflected onto said mirror (M, HM) and thereby is directed towards said eye of the wearer, so as to cause visualization of a computer-generated image by the wearer, for adjusting the distance of visualization of the computer-generated image by the wearer; and/or adjusting the gaze direction of visualization of the computer-generated image by the wearer; and/or adjusting the size and the field of view of the visualized image; and/or correcting secondary optical aberrations in the visualization of the computer-generated image by the wearer, such as aspherization, field aberrations; and/or where the wearer is ametropic, correcting at least partially the wearer's ametropia for the visualization of the computer-generated image by the wearer.

In one aspect, the present invention relates to a method for the display and visualization of computer-generated images, comprising the steps of:
(a) providing a wearer with a head-mounted device (HMD) as described herein,
(b) controlling the light-field display so as to adjust the distance of visualization of the computer-generated image by the wearer; and/or adjust the gaze direction of visualization of the computer-generated image by the wearer; and/or correct secondary optical aberrations in the visualization of the computer-generated image by the wearer, such as aspherization, field aberrations; and/or where the wearer is ametropic, correct at least partially the wearer's ametropia for the visualization of the computer-generated image by the wearer.

In some embodiments of the method of the invention, the head-mounted device (HMD) further comprises at least one scene camera, and step (b) comprises the steps of:
(i) determining a distance and/or gaze direction of visualization, by the wearer, of an object in the natural vision field, based on data collected from the scene camera, and
(ii) controlling the location of the array of optical microelements with respect to the digital display element of the light-field display, so as to adjust the distance and/or gaze direction of visualization, by the wearer, of the computer-generated image, as a function of the distance and/or gaze direction determined at step (i), and
(iii) optionally, repeating steps (i) and (ii) in a time-lapse fashion.

In some embodiments of the method of the invention, the head-mounted device (HMD) further comprises at least one luminance or luminosity sensor and optionally an electrochromic cell located in front of said eye of the wearer, and step (b) comprises the steps of:
(i) determining at least one value of luminance or of luminosity, based on data collected from the luminance or luminosity sensor, and
(ii) controlling the location of the array of optical microelements with respect to the digital display element of the light-field display so as to adjust the gaze direction of visualization, by the wearer, of the computer-generated image, as a function of the value(s) determined at step (i), and/or optionally controlling the electrochromic cell as a function of the value(s) determined at step (i), and
(iii) optionally, repeating steps (i) and (ii) in a time-lapse fashion.

In some embodiments of the method of the invention, the head-mounted device (HMD) further comprises at least one eye-tracker, and step (b) comprises the steps of:
(i) determining a distance and/or gaze direction of visualization, by the wearer, of an object in the natural vision field, based on data collected by the eye tracker, and
(ii) controlling the location of the array of optical microelements with respect to the digital display element of the light-field display so as to adjust the distance and/or gaze direction of visualization, by the wearer, of the computer-generated image, as a function of the value(s) determined at step (i), and
(iii) optionally, repeating steps (i) and (ii) in a time-lapse fashion.

In some embodiments of the use or the method of the invention, the see-through mirror and/or the image source is/are configured for adjusting at least partially the wearer's vision for the visualization of said displayed computer-generated image; for example, where the wearer is ametropic, the see-through mirror and/or the image source may be configured for correcting at least partially the wearer's ametropia for the visualization of said displayed computer-generated image.

BRIEF DESCRIPTION OF THE DRAWINGS

FIG. 1 shows HMDs of the invention (partial views).

FIG. 2 shows lenses for HMDs and methods of the invention.

FIGS. 2a-2c show exemplary structures and implementations of light-field displays for HMDs and methods of the invention.

FIG. 3 shows possible visualizations (vision zones) obtained with the HMDs and methods of the invention.

FIGS. 6a and 6b show exemplary HMDs of the invention.

FIG. 7 shows principles for recording a holographic mirror (left) and utilization of the mirror by restitution of its optical function in virtual image visualization (right).

FIG. 8 shows an optical arrangement for recording a holographic mirror.

FIG. 11 shows optical arrangements for recording a holographic mirror on a lens comprising an electrochromic cell.

FIG. 12 shows an optical arrangement for recording a holographic mirror with an extended field on a lens.

DETAILED DESCRIPTION OF THE INVENTION

Definitions

Figure 4:
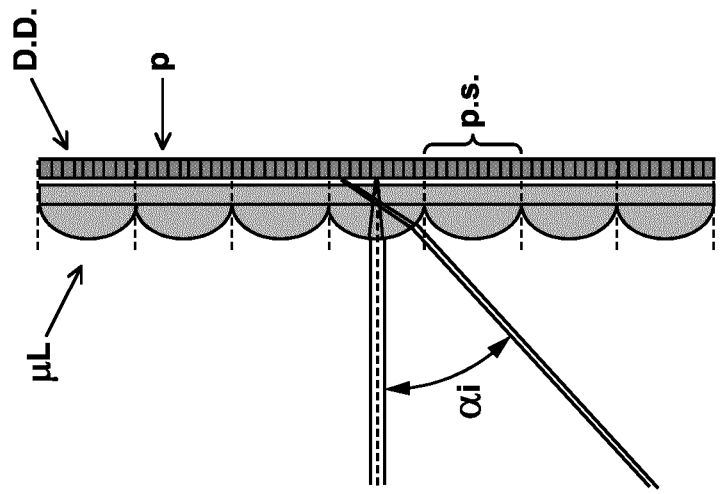
FIG. 4 shows the use of a plenoptic camera (sensor) to determine an incident angle.

The following definitions are provided to describe the present invention.

"Computer-generated images" are known in the art. According to the present invention, computer-generated images comprise any computer-generated images, such as 2D- or 3D-diffraction images, 2D- or 3D-computer-generated holographic images, any amplitude images etc. Computer-generated images may be used as virtual images. In some embodiments, the images (data) can be calculated in order to correct at least partially optical aberrations such as the fixed aberrations of the display, natural aberrations or aberrations linked to image orientation or position in front of the mirror, and the aberrations of the mirror used with a given orientation or position of the display.

"Holographic images" are known in the art. Such holographic images can be displayed by reading (illuminating) holograms. Computer-generated holograms are also referred to as synthetic or digital holograms. Computer-generated holograms are generally obtained by selecting a 2D or 3D image, and digitally computing a hologram thereof. The holographic image can be displayed by optical reconstruction, namely by illuminating (reading) the hologram with a suitable light beam (reference beam of the hologram). Holographic images can be 2D or 3D. The same calculation may be used to define the phase masks that can be used in front of the display to design the desired light-field display.

"See-through mirror" (M) are known in the art. Such mirrors include holographic mirrors (HM), semi-transparent mirrors, and dichroic minors, etc. For HMDs, these mirrors may have a specific geometry to reflect the visualized image towards the eye of the wearer. A preferred example is a holographic mirror, in particular a holographic minor for which the specific geometry is recorded on an ophthalmic lens curve.

"Holographic mirrors" (HM) are known in the art. The minor is defined as a holographic minor, if it was recorded using a holography process. But according to the invention, the holographic minor is for visualization purposes. This mirror is used to reflect a light beam generated from an image source, so as to cause the visualization of the image by the wearer. The holographic mirror is not used to reconstruct a recorded holographic image (as is the case in traditional hologram viewing). Due to the recording, advantageously according to the invention, the mirror is imparted an optical function, that is able, where applicable, to modify the wavefront of the light beam stemming from the image source, upon reflection onto said mirror. This allows to correct the virtual vision of the wearer, because the lens of the invention (incorporating the minor), can modify the light beam that generates the image in the eye of the wearer.

The virtual image is thus not necessarily a holographic image. It can be any virtual image, such as a 2D or 3D image. The nature of the image results from the nature of the image source, not from the holographic nature of the holographic mirror. It is possible to use, as an image source, a holographic image source, in which case the virtual image is a holographic image.

Such holographic minors are described in more detail hereinafter.

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the superimposed visualization of a computer-generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from ophthalmic lenses, such as prescription lenses. In preferred embodiments, the HMD is a pair of eyeglasses provided with lenses.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of grayscale. The SLM can be transmissive or reflective. It can be illuminated thanks to a fully or partially coherent source (e.g. lasers, diode lasers) or incoherent source (e.g. LED, OLED display screen).

"Image sources" (IS) are known in the art. An image source is any light source that can emit a light beam suitable (arranged, configured) for displaying the image for visualization by the wearer. Visualization occurs after the illumination beam stemming from the image source is reflected onto the see-through mirror. Regarding display of holographic images, the light beam comprises the reference beam for the hologram. The image can be displayed from image data (for example computer-generated image data).

According to the invention, the IS comprises a light-field display (LFD).

According to the invention, the IS may advantageously comprise a controller, a graphic card, one or more batteries, wiring, etc.

According to the invention, the IS may also have a multi stack structure.

According to the invention, the IS may be "off-axis", in that it may be located next to the temple of the wearer, for example on the temple component of the HMD, such as a temple component of spectacles.

"Light field displays" (LFD) are known in the art. They are sometimes referred to as plenoptic displays, or integral-imaging display. In some embodiments (array of micro-holes, see below), they may be referred to as multi-pupil, multi-aperture, or aperture synthesis displays.

In some embodiments, an LFD comprise a display (micro-screen) in front of which is positioned an array of micro-lenses. See FIG. 2a. The micro-screen (digital display, D.D.) comprises a plurality of pixels p. A given set of pixels p.s. corresponds to a given micro-lens (µL). The location of the image with respect to the array makes it possible to set (adjust, tune) the direction for display of the image I, as well as the distance for visualization by the wearer. Where the micro-screen is located at the focal point of the micro-lens, the image is displayed at infinite distance ∞. See FIG. 2b. In order to visualize the image at finite distance (in a given plan), it is possible to change the distance between the micro-lens array and the micro-screen. This may be achieved by selecting the location (within the micro-screen) of the displayed pixel p1. In such case, one can display the image I at a given distance and at a given location (gaze direction). See FIG. 2c. Where the focal distances of the micro-lenses are very short, a slight difference in location thereof results in a large difference in terms of focal plan.

In some embodiment, where the array comprises micro-holes or other micro-optical elements, it is possible to compute the displayed image in order to adapt it in terms of distance and position of visualization without any movement of the array.

By way of example, for a light-field display:
display: (4000×4000 px) of 9 μm side length (about 36 mm side length);
array of 296×296 micro-lenses of 125 μm side length; this corresponds to a 12×12 pixels pixel set for each micro-lens.

According to the invention, by way of example, it is advantageous to use high resolution (full HD) pixels having a size of 5 μm or less, with an array of micro-lenses of 10-50 μm side length.

Figure 2C:
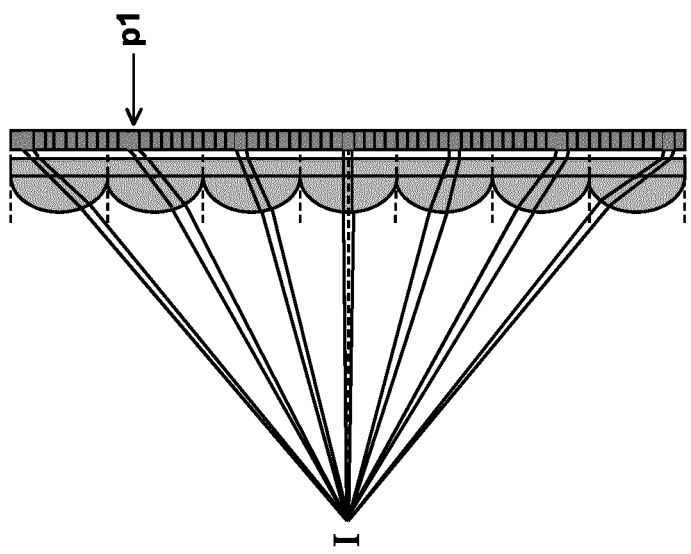

FIGS. 2a to 2c may be transposed to an embodiment wherein the array of micro-lenses is replaced by an array of micro-holes, or any other array of micro-elements as disclosed herein.

More generally, the present definition of LFD is at times based on an exemplary array of micro-lenses, but applies (and/or may be transposed) to any other array of micro-elements as disclosed herein.

More generally, according to the present invention, the LFD may comprise, instead of an array of micro-lenses, an array of refractive and/or diffractive micro-elements. In some embodiments, it is possible to use multiple arrays of optical micro-elements, wherein said multiple arrays may be identical or different, and may be stacked. The superposition of two or more arrays of identical or different optical micro-elements is advantageous in that it makes it possible to add functions (multiple distances of view, contrast, etc.).

As will be described thereafter, in some embodiments, the array of micro-lenses may comprise identical micro-lenses (including same focal length, same size) and the setting of focus may be performed by relative longitudinal movements of the array. In other embodiments, the micro-lenses may also be such that the focal lengths differ according to an area of the image to be visualized, for example so as to display in a near vision zone (NV) or in a far vision zone (FV), without moving the array (gradient of focal distances). It is also possible to compute the location (distance, orientation) of the array with respect to the screen so that the location of the image on the display pixels can define a NV zone and a FV zone.

The micro-lenses may all be of the same profile or geometrical type, for example selected from spherical, aspherical, cylindrical, biconvex, plano-convex, concave, plano-concave, biconcave, with positive meniscus, negative meniscus, etc. or each may independently be of any profile or geometrical type.

The micro-lenses may all have the same power or not. They may also be defined by their power (identical or different), such as spherical power, cylindrical power, prismatic power, etc.

The micro-lenses may also be active micro-lenses (liquid crystals, membranes, Fresnel lenses, pinholes, holographic lenses, etc.) to provide an active image modulation. This is advantages in that it may correct the wearer ametropia (ophthalmic data, prescription data, etc.) by locally displacing the visualization planes or the focus zones.

"Wearer ophthalmic data" or "ophthalmic data" (OD) are known in the art. Wearer ophthalmic data include wearer prescription data (PD), wearer eye sensitivity data (SD) and wearer ophthalmic biometry data (BD), and generally data pertaining to any wearer vision defect, including for example data pertaining to chromatic aberrations, lack of eye lens (aphakia), secondary aberrations such as aspherization or field aberrations, etc.

"Prescription data" (PD) are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A. In preferred embodiments, wearer prescription data PD are selected from astigmatism module, astigmatism axis, power, prism and addition, and more generally any data indicating the correction of any given vision defect. Such defect may result from a partial retinal detachment, retina or iris or cornea malformation, "Wearer eye sensitivity data" (SD) are known in the art. Wearer eye sensitivity data include data for spectral sensitivity (to one or more wavelengths or spectral bands); general sensitivity such as brightness sensitivity, for example for outdoors brightness sensitivity. Such data are of importance to optimize contrast for visualization of an image by the wearer.

"Wearer ophthalmic biometry data" or "biometry data" (BD) are known in the art. Biometry data include data pertaining to the morphology of the wearer, and typically include one or more of monocular pupillary distance, inter-pupillary distance, axial length of the eye, position of the centre of rotation of the eye, punctum remotum, punctum proximum, etc.

Head-mounted Devices of the Invention

In accordance with the invention, there is provided a head-mounted device (HMD) intended to be worn by a wearer. The head-mounted device is configured for the display and visualization, by the wearer, of computer-generated images. Said head-mounted device (HMD) comprises: an image source (IS), wherein the image source (IS) comprises a light-field display; and a see-through mirror (M), such as a holographic mirror (HM) situated in front of one eye of the wearer. The image source (IS) is configured for the emission of a light beam towards said mirror, wherein said emitted light beam is reflected onto said minor (M, HM) and thereby is directed towards said eye of the wearer, so as to cause visualization of a computer-generated image by the wearer. The mirror is located off axis with respect to the IS. This is illustrated by FIG. 1, showing the mirror M, such as a holographic mirror HM. The image source IS is located on the temple of an HMD in the form of spectacles. The IS may also include a deflector (e.g. holographic deflector, H deft).

In some embodiments, the mirror is a holographic mirror HM. This HM may be as described herein. Said HM may be configured so as to correct, at least partially, the wearer's vision. This includes possible visions defects, such as ametropia and/or lack of accommodation reserve. In particular, the HM may be configured so as to take into account the wearer's ophthalmic data OD, such as prescription data PD.

The HM may be provided on the front face, or rear face, or in the bulk of an ophthalmic lens. This is shown at FIG. 2 (L, Rx: lens, e.g. prescription lens); F: film of holographic material that may be recorded so as to provide a HM; G: glass).

The lens may be any type of lens, preferably a prescription lens.

The HM may also define various vision zones, whether in terms of gaze directions (e.g. up, down, left, right) or in terms of vision (near vision, far vision, intermediary vision, central vision, peripheral vision) or in terms of distance of visualization. The HM may be configured so as to take into account the wearer's ametropia or ophthalmic data, including prescription data.

Thus, advantageously according to the invention, the see-through minor and/or the image source (LFD) is/are configured for adjusting at least partially the wearer's vision for the visualization of said displayed computer-generated image. Notably, where the wearer is ametropic, the see-through mirror and/or the image source may be configured for correcting at least partially the wearer's ametropia for the visualization of said displayed computer-generated image. In some embodiments, correcting the vision includes correcting ametropia and/or minimizing accommodation. In some embodiments, correcting the vision is achieved through the configuration of the see-through mirror and/or the configuration of the image source (LFD) and/or of the image calculation (computer-generated image data inputted into the image source).

In some embodiments, in order to at least partially correct the vision, the emitted light beam may have a non-nil curvature. For example the emitted light beam may, along at least one axis, have a curvature of at least 0.25 diopters.

Light-field Displays in the HMD and Methods of the Invention

In some aspects, in the devices, methods and uses of the invention, the see-through mirror is a holographic mirror, and the light-field display comprises: an array of optical micro-elements, and a digital display element selected from digital display screens such as LED, OLED, LCoS and LCD display screens, etc.

In some embodiments, the optical micro-elements may be active or passive and/or said array of optical micro-elements may be selected from:
  arrays of micro-lenses,
  arrays of micro-holes,
  arrays of micro-prisms,
  arrays of liquid crystals (such as LCD or LCoS),
  arrays of gratings, and
  arrays of phase masks, etc.

In some embodiments, the light-field display comprises an array of optical micro-elements, and a digital display element comprising a plurality of pixels. Advantageously according to the invention, in the array of optical micro-elements, each optical micro-element may correspond to a subset of pixels in the digital display element (e.g. a given micro-lens may correspond to a given subset of pixels, a given micro-hole may correspond to a given subset of pixels, a given micro-prism may correspond to a given subset of pixels, . . . )

In some embodiments, all optical micro-elements in the array of optical micro-elements may be identical.

In some embodiments, the array of optical micro-elements may be one or more of the following:
  an array of micro-lenses, wherein said array of micro-lenses comprises at least two types of micro-lenses;
  an array of micro-holes, wherein said array of micro-holes comprises at least two types of micro-holes;
  an array of micro-prisms, wherein said array of micro-prisms comprises at least two types of micro-prisms;
  an array of liquid crystals, wherein said array of liquid crystals comprises at least two types of liquid crystals;
  an arrays of gratings, wherein said array of gratings comprises at least two types of gratings;
  an array of phase masks, wherein said array of phase masks comprises at least two types of phase masks.

By "two types", it is meant that the array of micro-elements comprises at least two sub-sets of micro-elements that differ with respect to at least one physical property, such as dimension (size, side length, diameter, depth, etc.), optical property (index; power; etc.), state (on or off; tunable or set; etc.), or relative distance from the micro-element to its respective subset of pixels in the digital display element.

By way of example, in some embodiments, the array of optical micro-elements may be an array of micro-lenses comprising at least two types of micro-lenses, wherein said at least two types of micro-lenses differ by one or more of the following:
  micro-lens diameter,
  micro-lens optical power (such as e.g. spherical, cylindrical or prismatic power),
  micro-lens profile (such as e.g. spherical, aspherical, cylindrical, biconvex, plano-convex, concave, plano-concave, biconcave, with positive meniscus, negative meniscus, etc.)
  relative distance from the micro-lens to its respective subset of pixels in the digital display element,
  active or passive nature of the micro-lens (e.g. liquid crystals or membranes).

By way of example, in some embodiments, the array of optical micro-elements is an array of micro-holes comprising at least two types of micro-holes, wherein said at least two types of micro-holes differ by one or more of the following:
  micro-hole dimension, such as diameter,
  micro-hole shape (square, round, rectangle, polygonal, etc.),
  relative distance from the micro-hole to its respective subset of pixels in the digital display element.

By way of example, in some embodiments, the array of optical micro-elements may be an array of liquid crystals, wherein said array of liquid crystals comprises at least two types of liquid crystals, wherein said at least two types of liquid crystals differ by one or more of the following:
  pixel size and/or pixel form (e.g. selected from different geometries such as square, rectangle, random shapes, etc.);
  chemical nature or family of liquid crystal;
  optical indices;
  values of control voltage.

Advantageously according to the invention, the at least two types of optical micro-elements (said at least two types of micro-lenses, respectively said at least two types of micro-holes, respectively said at least two types of micro-prisms, respectively said at least two types of liquid crystals, respectively said at least two types of gratings, respectively said at least two types of phase masks) are arranged so as to define at least two different areas in the array of optical micro-elements. The arrays in the LFD make it possible to define corresponding vision zones. The vision zones may be visions for the visualization of one or more computer-generated images. The vision zones may be defined according to an area of the image to be visualized, for example in terms of gaze directions (e.g. up, down, left, right and combinations thereof) or in terms of vision (near vision, far vision, intermediary vision, central vision, peripheral vision) or in terms of distance of visualization.

The HMD of the invention may comprise one or more smart sensors.

In some embodiments, the HMD of the invention may comprise one or more scene cameras, e.g. a light-field camera or a fish-eye camera or a standard camera. The camera may have a broad field aperture; it may be a plenoptic camera.

Where the HMD comprises a camera, it makes it possible to detect an item in a scene (including determine distance and/or gaze direction for viewing a real-life item); and then display one or more computer-generated images in the same or in a different gaze direction; and/or at the same or at a different visualization distance. For example, when the wearer views a picture in the museum, the camera detects the distance and gaze direction for viewing the picture (real life), and accordingly provides information for displaying information on the picture just below the picture, and at the same (or different) distance of visualization, e.g. corresponding to vision zones as described above. The displayed information may contain a tag, information, a picture, the name of the painter (augmented reality).

In some embodiments, the HMD of the invention may comprise one or more luminance sensors and/or luminosity sensors (brightness sensor), e.g. an ALS=ambient light sensor, a photodiode, or a broad field aperture or a plenoptic camera, etc.

Where the HMD comprises a luminance sensor and/or luminosity sensor, it makes it possible to detect vision zones that are darker than others. This makes it possible to elect to display information (computer-generated image) in a darker area of the M, HM, e.g. corresponding to vision zones as described above. This advantageously enhances vision due to improved contrast.

In some embodiments, the HMD of the invention may comprise one or more one or more eye-trackers, e.g. IR trackers or (IR) mirror or camera.

Where the HMD comprises one or more eye-trackers, it makes it possible to detect vision zones that are being used by the wearer (detect gaze directions). This makes it possible to elect to display information (computer-generated image) in or outside a given area of the M, HM, e.g. corresponding to vision zones as described above.

In such case, the HMD of the invention may further an electrochromic cell (EC). The EC cell may be present in or on a lens in the HMD. The EC cell may then advantageously be used to darken the lens, so as to enhance vision contrast and improve visualization of the computer-generated image by the wearer. More generally, the EC cell may also be used as in a conventional solar eyewear or solar HMD, whether adaptive or not.

Methods and Uses of the Invention

The present invention provides uses and methods for the visualization of computer-generated images. They are useful for augmented reality.

In accordance with the invention, a light-field display is used in a HMD for:
adjusting the distance of visualization of the computer-generated image by the wearer, and/or
adjusting the gaze direction of visualization of the computer-generated image by the wearer, and/or
adjusting size and field of view of the visualized computer-generated-image, and/or
correcting secondary optical aberrations in the visualization of the computer-generated image by the wearer, such as aspherization, field aberrations, and/or
where the wearer is ametropic, correcting at least partially the wearer's ametropia for the visualization of the computer-generated image by the wearer.

In accordance with the invention, a light-field display is used in combination with a recorded holographic mirror in a HMD for:
adjusting the distance of visualization of the computer-generated image by the wearer, and/or
adjusting the gaze direction of visualization of the computer-generated image by the wearer, and/or
adjusting size and field of view of the visualized computer-generated-image, and/or
correcting secondary optical aberrations in the visualization of the computer-generated image by the wearer, such as aspherization, field aberrations, and/or
where the wearer is ametropic, correcting at least partially the wearer's ametropia for the visualization of the computer-generated image by the wearer.

The visualization of the computer-generated image is provided by reflection, onto the holographic mirror, of the light beam emitted by the LFD.

In some embodiments, the HMD comprise a scene camera, and the visualization method involves:
(i) determining a distance and/or gaze direction of visualization, by the wearer, of an object in the natural vision field, based on data collected from the scene camera, and
(ii) controlling the light-field display so as to adjust the distance and/or gaze direction of visualization, by the wearer, of the computer-generated image, as a function of the distance and/or gaze direction determined at step (i), and
(iii) optionally, repeating steps (i) and (ii) in a time-lapse fashion.

In step (ii), the distance and/or gaze direction for the visualization, by the wearer, of the computer-generated image, may respectively be equal or not to that of the distance and/or gaze direction of visualization, by the wearer, of an object in the natural vision field from step (i). Step (iii) provides for enhance augmented reality experience, since the information can be collected time-lapse, so as to update the display as a function of time, for example if the wearer changes gaze directions, and/or turns the head, and/or the object in the natural vision field is moving.

In some embodiments, the HMD comprise at least one luminance or luminosity sensor and optionally an electrochromic cell located in front of said eye of the wearer, and in the visualization method, step (b) comprises:
(i) determining at least one value of luminance or of luminosity, based on data collected from the luminance or luminosity sensor, and
(ii) controlling the light-field display so as to adjust the gaze direction of visualization, by the wearer, of the computer-generated image, as a function of the value(s) determined at step (i), and/or optionally controlling the electrochromic cell as a function of the value(s) determined at step (i), and
(iii) optionally, repeating steps (i) and (ii) in a time-lapse fashion.

Step (ii) allows the control (tuning/adjustment) of contrast for visualization of the computer-generated image by the wearer. Step (iii) provides for enhance augmented reality experience, since the information can be collected time-lapse, so as to update the display as a function of changes in ambient luminosity.

In some embodiments, the HMD comprises at least one eye-tracker, and in the visualization method, step (b) comprises:
(i) determining a distance and/or gaze direction of visualization, by the wearer, of an object in the natural vision field, based on data collected by the eye tracker, and
(ii) controlling the light-field display so as to adjust the distance and/or gaze direction of visualization, by the wearer, of the computer-generated image, as a function of the value(s) determined at step (i), and
(iii) optionally, repeating steps (i) and (ii) in a time-lapse fashion.

This makes it possible to select and use different vision zones as described above.

Holographic Mirrors to be Implemented in Accordance with the Invention

Optical Properties of a Holographic Mirror

Holography techniques are known in the art. They generally involve first a step of recording on a suitable medium such as a holographic support, and then a step of reconstructing the holographic image. Recording generally involves dual illumination of the medium with a reference beam and an illumination beam. Reconstructing the holographic image can be performed by illuminating the recorded medium with the reference beam.

The principle for the minor is as follows (this is for the purpose of illustrating a situation wherein the wearer is emmetropic and the visualized image is located at infinite distances. A passive minor is recorded using a conventional holographic recording setting (optical arrangement), see FIG. 7 left. The mirror reflects the image displayed on the screen (image source). This screen is relatively close to the glass and forms an angle with respect to it. It is simulated by a divergent wave (beam) stemming from the actual distance and actual inclination of the screen. The image that is to be displayed is situated at infinity, in a direction perpendicular to the glass. The second interference beam is a plane wave in a direction perpendicular to the glass. When the screen is positioned, the image will be displayed at infinity and visible to the wearer as shown in FIG. 7 right (restitution of the hologram). The interference fringes between the two beams are recorded in the photosensitive material in the form of an index grating. This index grating reflects the optical function that is to be implemented.

In broad terms, for providing a holographic minor HM, the present invention implements a recording step, but does not involve the reconstructing step as described above. Reference is generally made to examples depicted at FIGS. 7 and 9.

In order to obtain a HM to be implemented according to the invention, a recording step is used so as to record (impart) an optical function in a film F of holographic material. The resulting (recorded film) is a minor that is used to reflect a beam from the image source, so as to cause visualization of a virtual image by the wearer.

Figure 9:
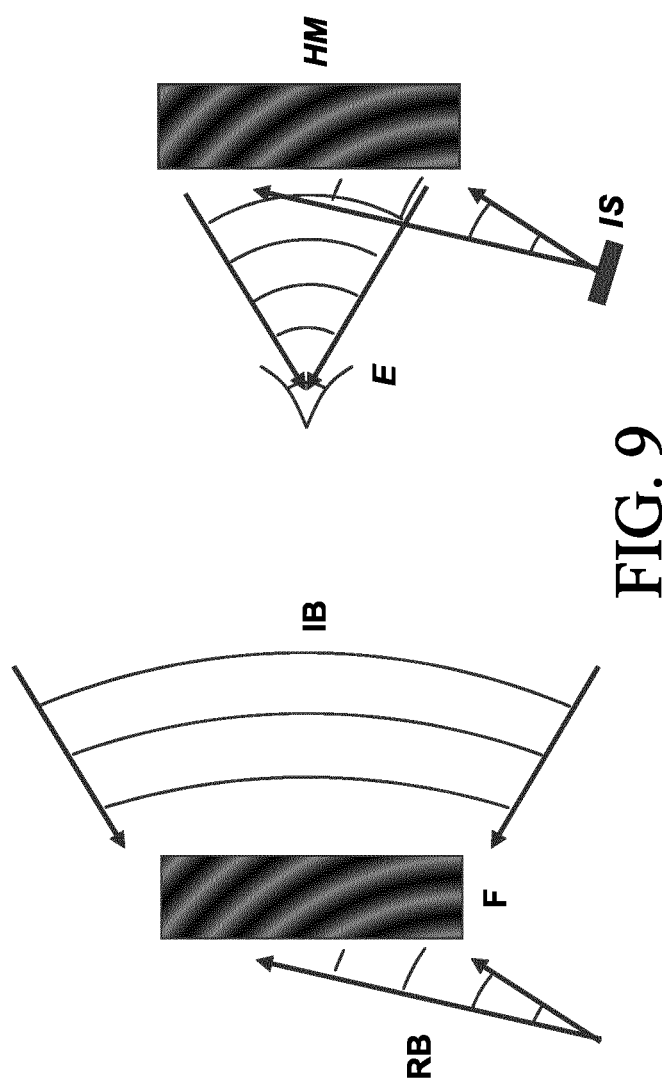
FIG. 9 shows principles for recording a holographic mirror (left) and utilization of the mirror by restitution of its optical function in virtual image visualization (right).

This is illustrated by FIG. 7 and FIG. 9 wherein the holographic medium is a holographic minor: the left part shows medium recording and the right part shows visualization of the virtual image (from the image source) by the wearer. An image source IS provides a beam that illuminates the holographic minor. The beam from the IS is reflected onto the minor towards an eye (E) of a subject. In FIG. 7, the virtual image to be visualized is situated at infinite (or very large) distance of the wearer. FIG. 9 illustrates visualization of the virtual image in a situation of pupil conjugation. The virtual image is formed on the eye pupil.

In some embodiments, the HM may be configured so as to provide multiple vision zones and/or so as to at least partially correct the wearer's vision. In particular, where the wearer is ametropic, the HM may be configured to at least partially correct the wearer's vision.

Such HM may be obtained as described in EP 15 305 504.1 filed on Apr. 3, 2015, the entire contents of which are herein incorporated by reference. See also below.

Materials for Preparing a Holographic Mirror; Films of Holographic Materials

Such minors can be obtained from specific materials such as dichromated gelatins or photopolymers. Photopolymers can be in any physical state (liquid, solid, paste, etc.) and include those solid and those liquid under standard conditions. The mirror function is holographically recorded in the specific material.

Photopolymer formulations contain generally one or more monomers or oligomers presenting at least an ethylenically unsaturated photo polymerizable part and at least a system of photo-initiation of polymerization with at least one component that is sensitive to the illumination wavelength. They can contain a combination of a photo-initiator and a photo-sensitizer that allow the increase of the range of the spectral sensitivity for visible light. These photopolymer formulations can contain various additives such as, in a not exhaustive list, polymers, solvents, plasticizers, transfer agents, surfactants, anti-oxidizing agents, thermal stabilizers, anti-foaming agents, thickeners, levelling agents, catalysts and so on. Examples of photopolymers include commercial photopolymers, such as OmniDex (E.I. du Pont de Nemours (EP 0377182 A2)), Bayfol HX (Bayer), Darol (Polygrama) or SM-TR Photopolymer (Polygrama). Depending on their composition, in particular on the presence or not of solvents and on their viscosity, different types of processing can be envisaged. The thickness of the photopolymer layer may be from 1 to 100 µm and preferentially from 4 to 50 µm.

The formulations containing solvents can be processed in different ways, for example by spin coating, dip coating spray or bar coating of a plane substrate of glass (mineral or organic), or by spin coating, dip coating or spray coating on a curved substrate of glass (mineral or organic) in order to obtain the desired thickness. After coating, a step of evaporation of the solvent(s) is generally necessary to obtain the layer of photopolymer ready to be recorded. See FIG. 2 (left part).

When the formulations do not contain solvents, they can be used in the same way if their viscosity is not too high. In this case the evaporation step is not necessary. Nevertheless a preferred method consists in the direct encapsulation of the photopolymers between two glass plates (mineral or organic), with a plane or curved shapes. See FIG. 2 (right part).

Two methods can be used in this case. In the first one, the quantity of liquid required for a thickness from 5 to 50 µm, depending on the photopolymer, is deposited on the glass plate. The liquid contains spacers made of glass or polymer, of diameter from 5 to 50 µm adapted to the final desired thickness. The second glass plate is placed on the liquid drop. It allows the spreading and the confinement of the photopolymer. After exposition and polymerization the photopolymer is solid (or at least gellified) and it attaches the two glass plates together. A peripheral sealing is then performed to protect the edge of the photopolymer from contacts with liquids or atmosphere that may damage it along the time.

In the second method, a cell is assembled with two plates of glass (plane or curved) and sealed all along the periphery except at a hole that allows the filling of the cell with the liquid photopolymer. The filling can be performed by putting the cell under low pressure or vacuum and plunging it in the photopolymer. The hole is then sealed with organic glue, for example glue that polymerizes under UV or thermal treatment.

Another method comprises:
the deposition of the photopolymer on a flexible substrate, like a polymer film, polyester for example,
the removal of eventual solvents by evaporation or heating,
the transfer of the film coated by the photopolymer onto a substrate (mineral or organic) with plane or curved shape using well-known transfer processes and adapting them to used materials (film and photopolymer) (for example ESSILOR patent applications WO2007144308 A1, WO2010010275 A2). The photopolymer can be, in this case, at the surface of the transferred film or in contact with the substrate.

After deposition of the photopolymer and before its exposure, one needs to let it rest during typically 15 minutes to 2 hours. The stress linked to the process of deposition disappears during this time. After the recording of the holographic mirror, a post-exposure under UV is performed to polymerize the residual monomers.

The photopolymer layers can be coloured with photo-sensitizers that absorb a part of the visible light. These photo-sensitizers are preferentially chosen to lose completely their colour after exposition to the visible light. A post-exposition under UV or white light reduces the residual absorption.

A thermal treatment can be realised depending on the used materials to increase the refractive index modulation of the hologram and its diffraction efficiency.

In some embodiments, said holographic mirror (HM) (respectively, said film (F) of unrecorded holographic medium) is provided on the front surface of an ophthalmic lens, on the rear surface of an ophthalmic lens, or between the front surface and the rear surface of an ophthalmic lens. Said ophthalmic lens may be selected from single-vision lenses, multifocal lenses such as bifocal lenses and progressive addition lenses, and semi-finished lens blanks.

Recording a Holographic Mirror

The recording of a minor can be performed in accordance with an optical arrangement. An exemplary optical arrangement is shown on FIG. 8. On this figure, the recording implements a laser. A polarization beam splitter PBS allows to 'divide' the beam. References signs PMF are polarization-maintaining fibers. The split of the beam provides for two beams: a reference beam RB illuminating one side of a holographic recording medium, and an illumination beam IB illuminating the other side of the holographic medium. This allows the recording of a holographic minor HM. Once the optical arrangement is set (e.g. geometry, sizes of the beams, etc.), features of the holographic minor can be modified by varying one or more parameters, including the power ratio between the two beams (impacts the fringe contrast and the diffraction efficiency), the exposure time (impacts the diffraction and diffusion efficiency), and the possible use of rotatable supports for the ends of the fibers (impacts the polarization of the beams when exiting the PMF fibers).

Examples of parameters for an optical arrangement and recording are provided at Example 4.

Holographic Mirror Provided on an Ophthalmic Lens; Ametropia Correction

In some embodiments, the HMD comprises one or more ophthalmic lenses, and the HM is provided in/on one or more of said lenses. In such embodiments, the HM may be obtained in accordance with the following method (reference is generally made to non-limiting examples depicted on FIG. 10-13):

(1) providing an ophthalmic lens having a front surface and a rear surface, wherein said ophthalmic lens comprises a film (F) of unrecorded holographic medium, wherein said ophthalmic lens optionally further comprises an amplitude modulation cell, for example selected from electro-chromic cells, polarizing cells and photochromic cells, (2) performing holographic recording of said holographic medium by generating interference between a reference beam (RB) and an illumination beam (IB) so as to provide an ophthalmic lens comprising a holographic mirror (HM), wherein the holographic recording is performed in an optical arrangement that takes into account at least the (spatial) configuration of the frame of the HMD, and (3) optionally cutting the lens obtained from step (2).

Advantageously according to step (2), the configuration of the RB mimics (simulates) the configuration of the IS on the frame, with respect to the HM in the lens fitted into the frame. In particular, the spatial configuration of the RB reflects the spatial configuration implemented for recording the mirror once the lens is fitted into the frame (orientation, distance, breadth (shape and size of zone projected on the lens), etc.). The physical location of the image source IS build-in on the frame may thus further define a secondary (re-imaged) corresponding image source. Thus, the configuration of the IB may reflect emission from the physical image source IS, or from a secondary (re-imaged) image source.

Advantageously, the optical arrangement of step (2) allows to provide with a holographic minor that leads to the desired optical function, namely the holographic mirror obtained by step (2) is 'automatically' configured for providing the suitable optical function for at least partially correcting the wearer's ametropia for virtual vision through the lens.

Figure 10:
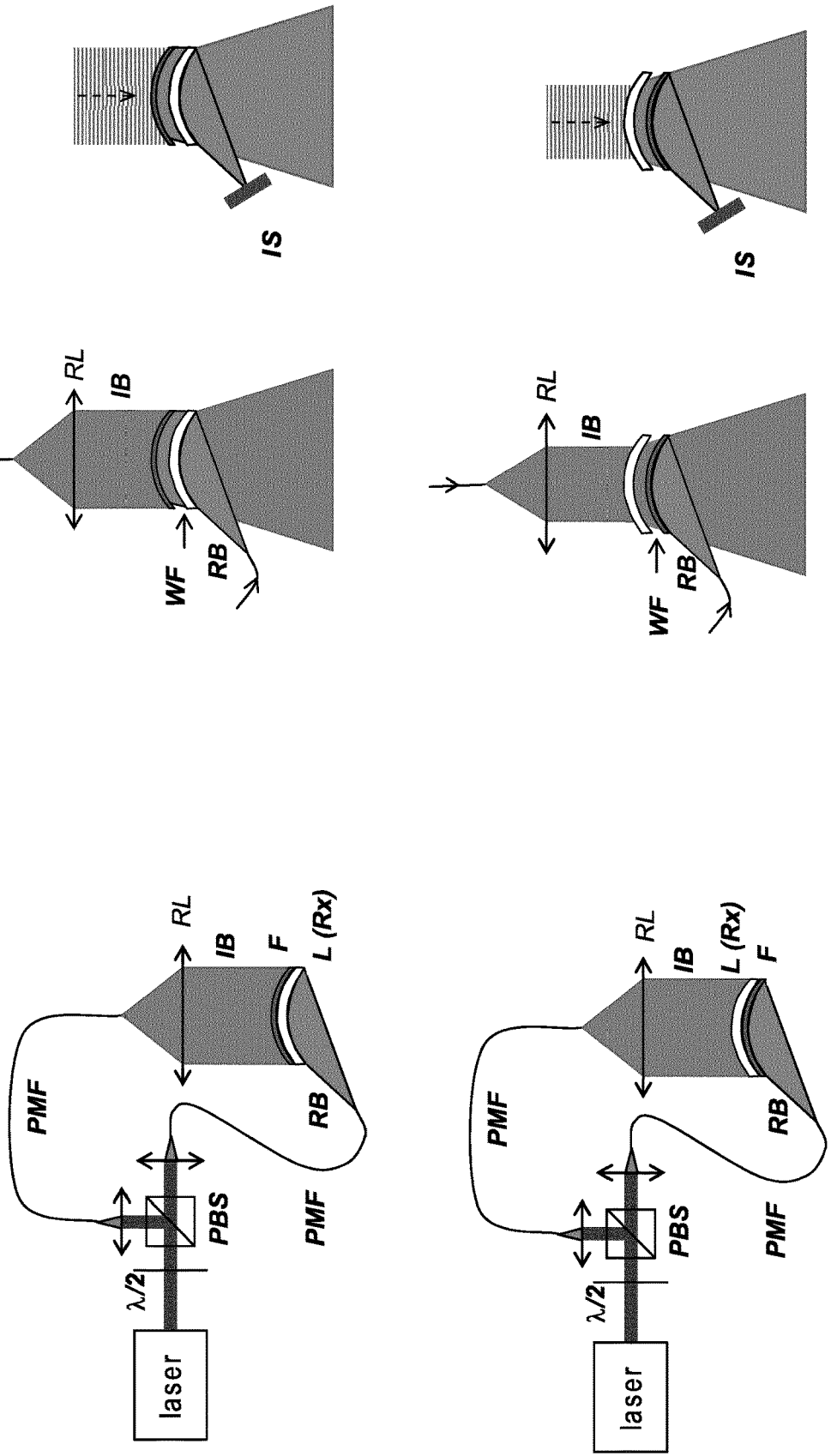
FIG. 10 shows optical arrangements for recording a holographic mirror.
Figure 13:
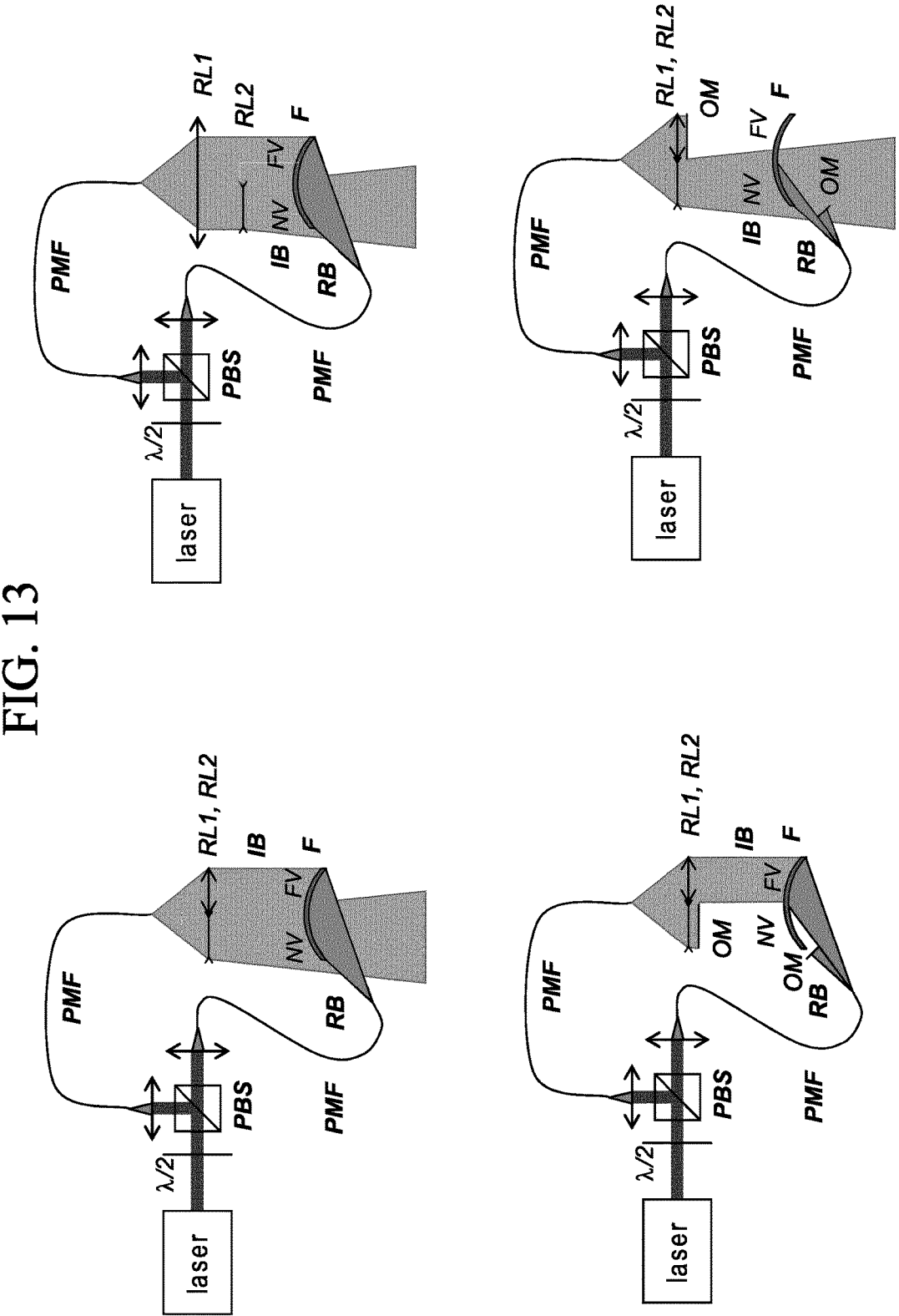
FIG. 13 shows an optical arrangement for recording a holographic mirror in accordance with the invention.

As shown on the right part of FIG. 10, for the first case where the film F is on the front side of the lens L, a light beam from the image source IS pass through the lens L and is reflected on the holographic minor HM. The reflected wavefront WF is the same than the wavefront of the illumination beam IB, meaning that the virtual image seems to "come" from infinity, i.e. as the natural image. The lens corrects thus the natural vision and the vision of the virtual image at the same time. When the film F is on the rear side on the lens L, the wavefront of the illumination beam after crossing the lens L is divergent on the film F. A beam of the image source IS is thus reflected with the same wavefront than the real image seen through the lens L, and the virtual image seems to be originate from the same place than this real image. To achieve that, the lens may have a value of power identical or close to the prescription data PD of the wearer.

In some embodiments, the optical recording of step (2) further takes into account:
the distance of visualization (D) of said displayed virtual image by the wearer when wearing the frame and/or
the direction of visualization of said displayed virtual image by the wearer when wearing the frame and/or the number of areas of the holographic mirror for the visualization of said displayed virtual image by the wearer when wearing the frame.

In some embodiments, the wearer is ametropic, the ophthalmic lens of step (1) is configured for correcting the wearer's ametropia for natural vision and is selected from single-vision lenses, multifocal lenses, for example selected from bifocal lenses, and progressive addition lenses.

In some embodiments, the optical arrangement of step (2) is such that the illumination beam (TB) is spatially configured with:
  one or more recording lenses (RL, RL1, RL2) selected from unifocal lenses, multifocal lenses such as bifocal lenses, and progressive addition lenses, or a lens matrix (LM), or an active lens with phase modulation and optionally an opaque mask (OM).

In some embodiments, the optical arrangement of step (2) is such that:
  the reference beam (RB) simulates the beam of the build-in image source to be used for illuminating said holographic mirror so as to cause the display of the virtual image to be visualized by the wearer when wearing the frame, and
  the illumination beam (TB) is configured so as to define the distance of visualization (D) of said displayed virtual image by the wearer when wearing the frame and/or
  the direction of visualization of said displayed virtual image by the wearer when wearing the frame and/or
  the number of areas of the holographic mirror for the visualization of said displayed virtual image by the wearer when wearing the frame.

In some embodiments, the optical arrangement of step (2) is such that the illumination beam (IB) is configured so as to differentially record a plurality of areas (A1, A2, NV, FV) on the film (F) of unrecorded holographic medium, optionally wherein each area (A1, A2; NV, FV) corresponds to equal or distinct values of distance of visualization (D; D_nv, D_fv) of said displayed virtual image by the wearer and/or corresponds to equal or distinct directions of visualization of said displayed virtual image by the wearer.

In some embodiments, the optical arrangement of step (2) is such that the illumination beam (IB) is configured in accordance with an ergorama, wherein said ergorama defines the distance of visualization (D) and/or direction of visualization of said displayed virtual image by the wearer as a function of the gaze directions when wearing the frame.

In some embodiments, the wearer is ametropic and said method is a method for providing a progressive addition lens (respectively a multifocal lens such as such as a bifocal ophthalmic lens, respectively a single-vision lens), wherein the ophthalmic lens of step (1) is a progressive addition lens (respectively a multifocal lens such as a bifocal ophthalmic lens, respectively a single-vision lens), and wherein the holographic recording of step (2) is performed so that the holographic mirror (HM) comprises at least an area for near vision (NV) and an area for far vision (FV) corresponding to distinct values of visualization (D_nv, D_fv) of displayed virtual image by the wearer.

In some embodiments, the wearer is ametropic and said method is a method for providing a single-vision lens with an HM, wherein the ophthalmic lens of step (1) is a semi-finished lens blank, wherein the optical arrangement of step (2) includes the implementation of an auxiliary single-vision lens (AL) whose optical power takes into account the optical power required to correct the wearer's ametropia and the optical power of the semi-finished lens blank, and wherein the auxiliary single-vision lens (AL) is for spatially configuring the reference beam (RB) or the illumination beam (IB).

In some embodiments, said method is a method for providing a progressive addition lens (respectively a multifocal lens such as a bifocal ophthalmic lens, respectively a single-vision lens) with an HM, wherein the ophthalmic lens of step (1) is a progressive addition lens (respectively a multifocal lens such as a bifocal ophthalmic lens, respectively a single-vision lens), and wherein the holographic recording of step (2) is performed so that the holographic mirror HM comprises at least an area for near vision NV and an area for far vision FV corresponding to distinct values of distance of visualization D_nv, D_fv of displayed virtual image by the wearer. See for example FIG. 13.

Advantageously, the above methods provide holographic mirrors on lenses (e.g. unifocal, multifocal such as bifocal, progressive addition) that provide for dual virtual vision, with the HM mirror specifically configured to comprise at least an area for virtual near vision and at least an area for virtual far vision.

In some embodiments, the method provides a lens with an HM that comprises an amplitude modulation cell as described herein, such as an electrochromic cell EC. See for example illustrative optical arrangements in FIG. 11.

As an alternative to implementing an auxiliary lens (AL), it is possible to directly change the wavefront coming from IB or RB using an active lens with a modulation phase, for example a varying power lens using adaptive optics technics. In some embodiments, the IB is such that it covers an extended field on the lens. See for example FIG. 12.

The invention is illustrated by the following non-limiting examples.

EXAMPLES

Example 1

HMD and Method for an Ametropic Wearer

A HMD is provided with an LFD as a light source. The LFD comprises an array of immobile (fixed location) and passive identical micro-lenses whose focal lengths are determined according to the wearer's prescription data. For example, if the wearer has a prescribed cylinder power value of 1D with axis of 30°, then the passive lenses also have values of cylinder axis and power in the vicinity of 30°/1D.

The display can be oriented to directly illuminate the holographic minor (FIG. 1 left). A deflection component may be used to make the system more compact by positioning the LFD display in a position parallel to the spectacle temple (FIG. 1 right). The deflection component may be a micro-prism array (mobile or not to adjust the image position on the screen in addition to or instead of the action of micro-lenses), or a holographic component (array, collimating and deflecting lens, deflective micro-lens array, etc.).

Alternatively by moving the array of micro-lenses or by using active lenses to change the focus, it is possible to directly use the image generated by the light-field display with an array of non-mobile passive micro-lenses to correct the ametropia of the wearer. In one embodiment, the sizes of the micro-lenses can be substantially smaller than the diameter of the pupil, e.g. in the order of magnitude of about 1 mm so that the size of the spot formed on the retina is not too large.

The following provides an example of embodiment for a myopic wearer (−1D), for the display of a single light spot:

in this case, to get a sharp image to be visualized by the myopic wearer, the image is displayed at a calculated distance of (−1 m). For example, it is possible to use a 5×5 micro-lens array. The micro-lenses are imaged on the pupil of the eye via the holographic minor, and the image of each micro-lens has a size in an order of magnitude of about 1 mm.

Each micro-lens therefore 'addresses' a different part of the eye pupil. The light beams at the output of each micro-lens are collimated, but have different directions which intersect at −1 m. The light spots created on the retina by each micro-lens then overlap perfectly, and then generate a final single light spot of reduced size. The size is reduced because the micro-lenses are smaller and generate a pinhole effect.

This configuration makes it possible to compensate the wearer's ametropia by varying the virtual distance provided by the plenoptic screen (LFD).

The distance is 1/S with S=spherical correction, and in the case of an astigmatic wearer this distance is 1/Cmin and 1/Cmax following the astigmatism axes.

Example 2

HMD and Method for Display and Visualization of Multiple Zones

FIG. 3 shows possible images visualized by a wearer. The LFD provides the possibility to use different vision zones. Such zones 1, 2, 3, 4, 5 may be defined according to varying gaze directions. For example (FIG. 3 left), zone 5 corresponds to central vision, while zones 1-4 are peripheral vision. Such zones may also be defined in terms of distance of visualization of the computer-generated image.

Example 3

HMD and Method for Display and Visualization with Smart Sensors

According to the invention, the HMD may comprise one or more smart sensors. Each sensor may be used to analyze the wearer's environment (real-life environment and wearer), so that the display can be customized for a given situation. The display can advantageously be performed time-lapse to adjust to the situation in 'real-time'.

Example 3.1

HMD and Method for Display and Visualization with Scene Camera as Smart Sensor

For applications in augmented reality, it is advantageous to have a scene camera for 'integrating' the virtual objects (computer-generated images) into the real world.

This camera can be a conventional camera. In order for the camera to have a vision field similar to that of the human eye, it is possible to use a wide angle lens, e.g. of the fish-eye type. A conventional camera however generally does not allow the precise determination of the depth of the observed scene field. One method is to use a lens with variable focus and to rebuild (recreate) distances by successively measuring focus distances. It is then possible to visualize an image of the 3D scene and to measure the distance to the objects. A second method is to use multiple cameras. Using at least two cameras allow to look at the scene with different points of view and thus to obtain a triangulation to describe the scene. A third method uses the constant movements of the wearer. In this case, knowing the position of the camera (accelerometer, for example), it is possible to trace back the distance and position of objects. Indeed, the image analysis allows the determination of the direction of the beams from the scene, and therefore the position of the objects relative to the camera.

Figure 5:
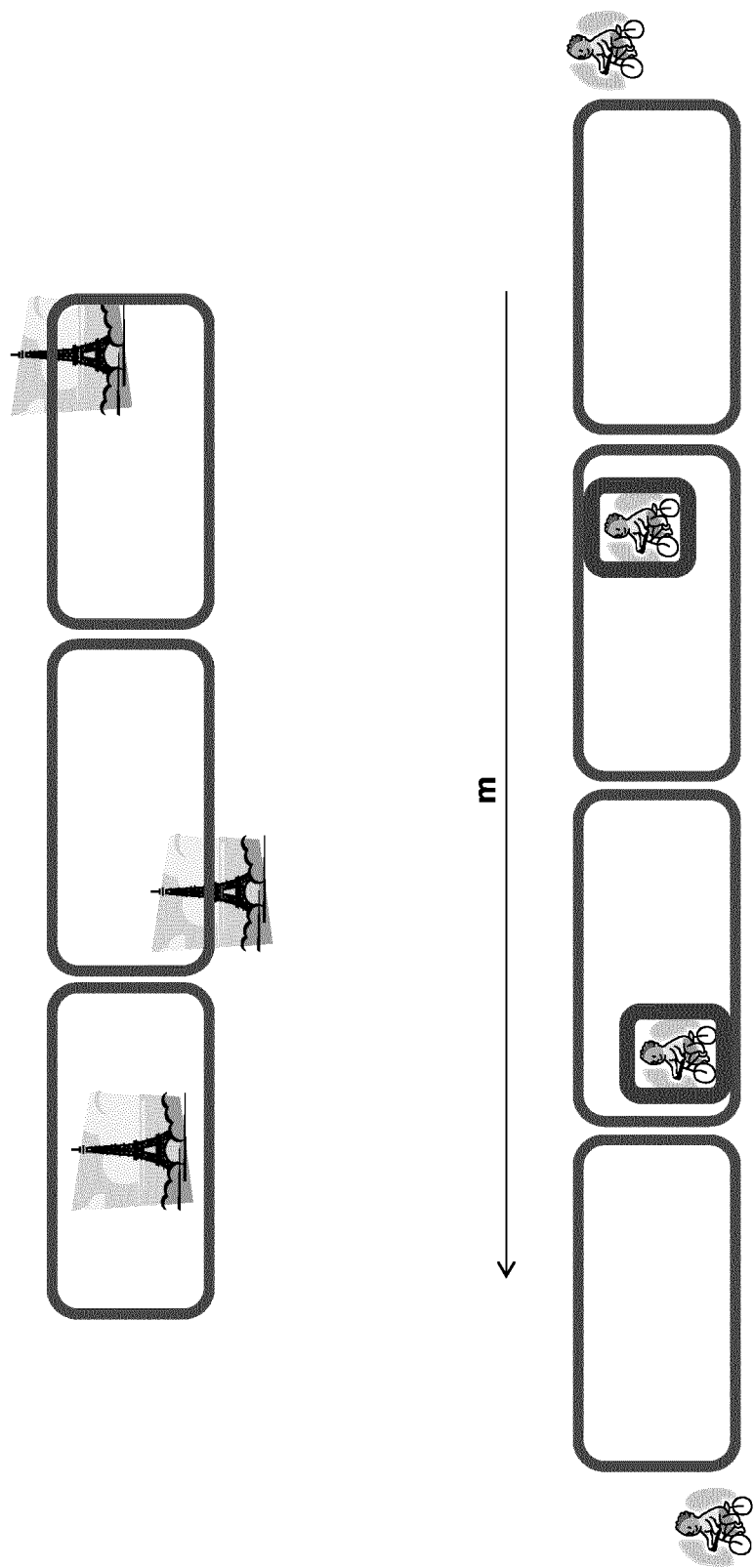
FIG. 5 illustrates time-lapse augmented reality obtainable with the HMDs and methods of the invention.

It is also possible to use a plenoptic camera (light-field camera, LFC). FIG. 4 illustrates the principle for determining the incident angle cd, using a plenoptic camera (sensor). The principle is the same as for the plenoptic display. There is provided a sensor capable of measuring low-resolution image of the scene on a sufficiently large solid angle (sr 2π). To this end, a micro-lens array (or a micro-hole array, etc.) is placed in front of a good resolution sensor matrix. Each micro-lens corresponds to a group (subset) of pixels. The beams from the scene are distributed by each micro-lens onto the pixel groups according to their direction and distance of the objects in the scene. It is then possible to obtain an image containing the position, distance and direction of (real) objects. An appropriate image processing can use the collected data for the display of the virtual object and the displayed computer-image can be made to 'evolve' within the real life scene. This can be performed either when this real object is fixed in the wearer's environment (FIG. 5 top: the Eiffel Tower is fixed in the real life scene, but the wearer moves the head: the display of computer-generated image, e.g. an annotation on the Eiffel tower, can 'follow' the gaze direction of wearer, and follow the visualization of the environment, as a function of the head movements of the wearer), or when it is in movement (FIG. 5 bottom: the wearer's head does not move, but the bicycle moves (m) in the real life scene). It is then possible, for example, to determine the position of a real object so as to display a virtual image (via plenoptic screen) which is at the same position, and in particular the same distance. This allows the wearer to visualize sharply and simultaneously the real image/virtual image at the same distance of visualization, regardless of its position.

Example 3.2

HMD and Method for Display and Visualization with Luminance or Luminosity Sensor as Smart Sensor The HMD of the invention may include a light (brightness) sensor, such as a luminance or luminosity sensor. For increasing the visual comfort of the wearer, it is advantageous to optimize the brightness and/or contrast of the virtual image and adapt same to the real world in which it is to be embedded.

The HMD of the invention may include a single sensor, a plurality of individual sensors or a sensor array (e.g. CCD, CMOS) for determining the position of bright areas on the mirror. This is particularly advantageous if the sensor array is equipped with a wide angle optical system (lens) similar or identical to the angle of human vision.

It is possible to use the scene camera to perform measurements of environmental brightness. Indeed, by calibrating the light sensor, one may obtain a 4D field (position in space and brightness) of the vision field. Such system is advantageously compact. This provides a mapping of the brightness of the scene.

This 4D field may then be used as an extended source for a ray-tracing calculation of the illumination of the pupil (or retina in the situation of an eye model). This calculation may further take into account the wearer's ophthalmic data, including prescription data and/or the position of the eye in relation to the HMD/frame and the vector light source.

As a function of the analysis of the scene (presence of zones of high brightness values, "carriers" available for the virtual image, etc.), it is possible to choose to display the image in a dark area for visualization, or to move the displayed image away from a very bright area, or to change the brightness of the screen if necessary, etc.

If the HMD is equipped with electrochromic glass (for example glasses with lenses incorporating an EC cell), the brightness measurement may automatically adapt the EC transmission to ambient conditions; this, either locally if the lens/glass is pixelated, or globally if it is not. In both situations, the 4D illumination matrix obtained via the scene camera may be used to compute the darkening of the lens/glass, e.g. with an algorithm that takes into account the results of psychophysical measurements (e.g. ophthalmic data, including prescription data or eye sensitivity data), such as illumination in central vision, peripheral illumination, etc. This may be performed using a weighting function to be determined. If the lens/glass is pixelated, it may then be possible to darken the area (e.g. zone in the virtual image area, zone in a very bright area, zone in central or peripheral vision, etc.). This coupling of the image display with the environmental analysis performed by the camera can also be used to control the electrochromic glass to only darken the useful spots, for example when it is not necessary or inappropriate or dangerous, to make the HMD/glasses fully dark.

Figure 6A:
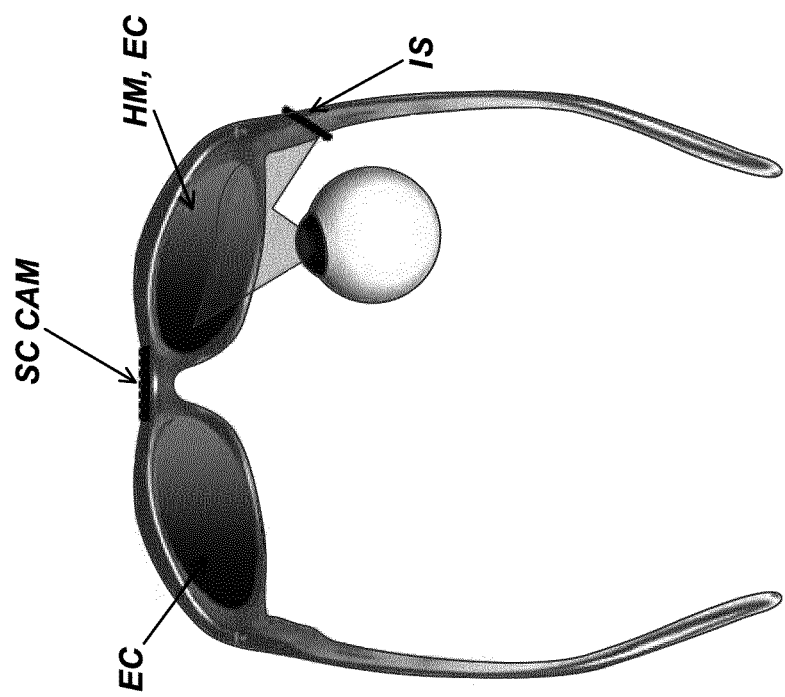

Glasses equipped with a plenoptic display and a plenoptic scene camera, a holographic minor and electrochromic cells are illustrated in FIG. 6. They are used to display virtual images comfortably in the real environment, taking into account this environment. Legend for FIG. 6a is as follows: SC CAM: plenoptic scene camera, also used as a brightness sensor; EC: electrochromic cell with management of the location of the light sources; HM, EC: holographic mirror with EC cell; IS: plenoptic display as image source.

Example 3.3

HMD and Method for Display and Visualization with Eye Tracker as Smart Sensor

Eye-tracking with IR Holographic Mirror

To follow the gaze direction and its convergence, and therefore to display the computer-generated images at the distance and in the gaze direction at which the wearer is already looking, it is possible to add an eye-tracking system. Infrared (IR) LEDs can illuminate the wearer's eye (taking into account eye safety). A camera can capture the eye and follow its movements and gaze directions. Classically, this camera may be directed towards the eye.

IR Holographic Mirror

For compactness issues, it is possible to use an IR holographic minor in the lens to redirect infrared reflection of eye-tracker IR LEDs towards the HMD/glasses temple. This mirror may be obtained in the same way as the image reflecting mirror, with the difference that it may not be required to take into account the wearer's prescription data. It may thus be achieved very simply. Being reflective in the infrared, it does not hamper the vision and the display in the visible spectrum, and will be totally transparent to the wearer.

An illustrative embodiment is shown on FIG. 6b: SC CAM: plenoptic scene camera, also used as a brightness sensor; EC: electrochromic cell with management of the location of the light sources; HM, EC: holographic mirror with EC cell [the HM actually comprises two HM: one HM for image visualization (use for visible wavelength) and one HM is an IR holographic minor for use with the eye trackers e-t (the two HMs may have different optical functions (in addition to the difference for the reflection wavelength), and in particular the two HM may have different reflection geometries]; IS: plenoptic display as image source; LED IR: infrared LEDs; IR C (e-t): infrared camera (eye-tracker).

Example 4

Holographic Mirror HM for an HMD and Method for Display and Visualization

An example of recording of a holographic minor is shown at FIG. 8, which depicts an exemplary optical arrangement for recording a holographic minor on a lens (lens not shown). In this example the laser emits at 532 nm (100 mW). PMF is a polarization-maintaining fiber (460-HP Nufern): panda fiber, core diameter 2.5 µm, ON 0.13, mode diameter: 3.5 µm@515 nm. The collimating lenses next to the polarization beam splitter PBS are of f=8 mm. the illumination beam IB is of 1 mW/cm$^2$. The reference beam RB is of 0.5 mW/cm$^2$. The lens generating the RB is of f=4 mm. The lens generating the IB (reference lens, RL) is of f=400 mm.

The lens on which the HM is formed is not shown. This lens is as follows: power −3D, front surface radius 87 mm, shape eyeglasses lens 40×50 mm or round diameter 70 mm. the film F is formed between two glass layers and positioned on the front side of the lens. The film F is as follows: diameter 70 mm, radius of curvature 87 mm, glass layer thickness 850 µm, photopolymer F thickness 5 to 50 µm (e.g. 40 µm) thanks to spacers, total stacking thickness ~1.65 mm, exposure time: 30 s to 10 min depending upon nature of photopolymer.

Depositing the film F for a lens of 70 mm diameter:
  depositing a 50 µL drop onto a glass layer (spacers: 5-50 µm, glass layer: thickness 500 µm; radius of curvature 87 mm, round diameter 70 mm; anti-reflection treatment or coating, especially 532 nm),
  positioning second glass layer; tightening,
  leave at rest for 20 min onto the illumination support member.

Illumination for 30 s to 6 min, as a function of the beam intensity (e.g. see FIG. 20), nature and thickness of photopolymer.

Bleaching by exposition to visible light for 15 min (e.g. halogen lamp, 50 to 75 W).

Sealing with glue if necessary.

During illumination:
  protect from physical disturbance (air movements, mechanical vibrations, dust, etc.)
  stabilized temperature (avoid air convection)
  black room (dark room: for example inactinic lighting for recording green light)
  coating (anti-reflection) onto glass (avoiding parasite reflections).

Characterization:
  Spectral (wavelength for reflection and minor efficiency)
  Qualitative optical properties (observe an OLED screen)
  Quantitative optical properties (wave front analysis).
  It is possible to combine with an EC cell.

Example 5

HMD and Method for Display and Visualization of Active Information

Figure 14:
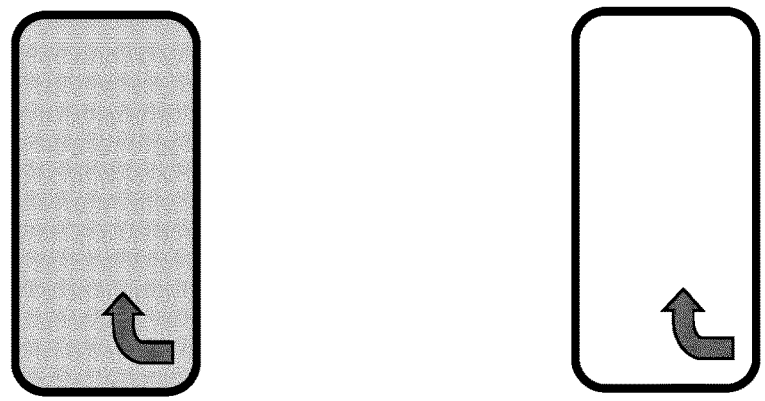
FIG. 14 shows exemplary embodiments of ways to use or operate the head-mounted device.

The HMD of the invention may be operated or used in different ways. According to one embodiment, the light-field display may be used to cover entirely the minor or holographic mirror HM. It is then possible to display a given virtual image as a part of the complete display (complete display corresponds to the entire surface of the minor; see FIG. 14 top: F: full display on entirety of mirror (full minor is illuminated by the IS); arrow: given image as part of the fully display F). To move the given virtual image (e.g. arrow (d) on FIG. 14 top), the active part of the display changes. It allows using only one set of corrections of the aberrations (eye of the wearer, display, HM, etc.). The array of optical micro-elements may be calculated with different lenses (profile, optical power, etc.), for example, in order to correct directly, and at least partially, the aberrations of the screen and/or the prescription of the wearer, etc. The modification of size, field of view and position is then advantageously easier to perform. One limitation is a loss in image resolution.

According to another embodiment, it is possible to use the (full) light-field display so as to display a given virtual image only on a sub-part of the mirror. See for example FIG. 14 bottom (L: local illumination of the minor only; full IS may be used to illuminate a sub-part of the mirror surface). The position, size, field and distance may be managed thanks to the micro-optical elements array and/or the computation of the image data. The resolution is thus high but the correction of the aberrations may have to be re-calculated for every change of the virtual image (e.g. displacement (d) on FIG. 14). The array of optical micro-elements may also be calculated with different lenses to correct directly and at least partially the aberrations of the screen and/or the prescription of the wearer, etc.

For both of the above embodiments, the correction of aberration/s and/or adjustment of position, distance, or size of the virtual image may be calculated fully or partially for the image display. In this case, the array of micro optical elements may be moved in order to obtain the desired action on the virtual image. The decision of changing the virtual image may be linked to the smart sensors (automatic mode) or to an action of the wearer through a manual or vocal or gesture command.

The invention claimed is:

1. A head-mounted device (HMD) intended to be worn by a wearer,
wherein the head-mounted device is configured for display and visualization, by the wearer, of computer-generated images,
wherein said head-mounted device (HMD) comprises:
an image source (IS), wherein the image source (IS) comprises a light-field display,
a see-through mirror (M) situated in front of one eye of the wearer, and
at least one scene camera
wherein the image source (IS) is configured for the emission of a light beam towards said mirror,
wherein said emitted light beam is reflected onto said mirror and thereby is directed towards said eye of the wearer, so as to cause visualization of a computer-generated image by the wearer,
wherein the see-through mirror and/or the image source is/are configured for adjusting at least partially the wearer's vision, by correcting at least partially an ametropia of the wearer for the visualization of said displayed computer-generated image by the wearer,
wherein the light-field display comprises an array of optical micro-elements and a digital display element, and
wherein the head-mounted device is configured to:
(i) determine a distance and/or gaze direction of visualization, by the wearer, of an object in the natural vision field, based on data collected from the scene camera, and (ii) change a location of the array of optical micro-elements with respect to the digital display element of the light-field display, so as to adjust the distance and/or gaze direction of visualization, by the wearer, of the computer-generated image, as a function of the distance and/or gaze direction determined at (i).

2. The head-mounted device (HMD) according to claim 1, wherein the see-through mirror is a holographic mirror, and
wherein
the optical micro-elements are active or passive, and wherein said array of optical micro-elements is selected from:
arrays of micro-lenses,
arrays of micro-holes,
arrays of micro-prisms,
arrays of liquid crystals,
arrays of gratings, and
arrays of phase masks;
and
wherein the digital display element is selected from digital display screens.

3. The head-mounted device (HMD) according to claim 1, wherein the
digital display element comprises a plurality of pixels, and wherein, in the array of optical micro-elements, each optical micro-element corresponds to a subset of pixels in the digital display element.

4. The head-mounted device (HMD) according to claim 3, wherein all optical micro-elements in the array of optical micro-elements are identical.

5. The head-mounted device (HMD) according to claim 3, wherein the array of optical micro-elements is:
an array of micro-lenses, wherein said array of micro-lenses comprises at least two types of micro-lenses; or
an array of micro-holes, wherein said array of micro-holes comprises at least two types of micro-holes; or
an array of micro-prisms, wherein said array of micro-prisms comprises at least two types of micro-prisms; or
an array of liquid crystals, wherein said array of liquid crystals comprises at least two types of liquid crystals; or
an arrays of gratings, wherein said array of gratings comprises at least two types of gratings; or
an array of phase masks, wherein said array of phase masks comprises at least two types of phase masks.

6. The head-mounted device (HMD) according to claim 5, wherein the array of optical micro-elements is an array of micro-lenses comprising at least two types of micro-lenses, wherein said at least two types of micro-lenses differ by one or more of the following:
micro-lens diameter,
micro-lens optical power,
micro-lens profile, relative distance from the micro-lens to its respective subset of pixels in the digital display element,
active or passive nature of the micro-lens;
or wherein the array of optical micro-elements is an array of micro-holes comprising at least two types of micro-holes, wherein said at least two types of micro-holes differ by one or more of the following:
micro-hole dimension,
micro-hole shape,
relative distance from the micro-hole to its respective subset of pixels in the digital display element.

7. The head-mounted device (HMD) according to claim 5, wherein the array of optical micro-elements, which includes said at least two types of micro-lenses, said at least two types of micro-holes, said at least two types of micro-prisms, said at least two types of liquid crystals, said at least two types of gratings, or said at least two types of phase masks, are arranged with a light source of said image source which emits said light beam so as to define at least two different areas in the array of optical micro-elements.

8. A method for display and visualization of computer-generated images, comprising:
(a) providing a wearer with the head-mounted device (HMD) according to claim 1, and
(b) changing the location of the array of optical micro-elements with respect to the digital display element of the light-field display, so as to correct at least partially the wearer's ametropia for the visualization of the computer-generated image by the wearer.

9. The method according to claim 8,
wherein the head-mounted device (HMD) further comprises at least one luminance or luminosity sensor, and
wherein (b) comprises:
(i) determining at least one value of luminance or of luminosity, based on data collected from the luminance or luminosity sensor, and
(ii) changing the location of the array of optical micro-elements with respect to the digital display element of the light-field display, so as to adjust the gaze direction of visualization, by the wearer, of the computer-generated image, as a function of the value(s) determined at (i).

10. The method according to claim 8,
wherein the head-mounted device (HMD) further comprises at least one eye-tracker, and
wherein (b) comprises:
(i) determining a distance and/or gaze direction of visualization, by the wearer, of an object in the natural vision field, based on data collected by the eye tracker, and
(ii) changing the location of the array of optical micro-elements with respect to the digital display element of the light-field display, so as to adjust the distance and/or gaze direction of visualization, by the wearer, of the computer-generated image, as a function of the value(s) determined at (i).

11. The head-mounted device (HMD) according to claim 2, wherein said arrays of liquid crystals are selected from LCD and LCoS, and said digital display screens are selected from LED, OLED, LCoS, LCD and SLM display screens.

12. The head-mounted device (HMD) according to claim 6, wherein said micro-lens profile is selected from spherical, aspherical, cylindrical, biconvex, plano-convex, concave, plano-concave, biconcave, with positive meniscus and negative meniscus, and wherein said micro-hole dimension is a diameter.

13. The method according to claim 8, wherein the head-mounted device (HMD) further comprises at least one luminance or luminosity sensor and an electrochromic cell located in front of said eye of the wearer, and
wherein (b) comprises:
(i) determining at least one value of luminance or of luminosity, based on data collected from the luminance or luminosity sensor,
(ii) changing the location of the array of optical micro-elements with respect to the digital display element of the light-field display, so as to adjust the gaze direction of visualization, by the wearer, of the computer-generated image, as a function of the value(s) determined at (i), and/or controlling the electrochromic cell as a function of the value(s) determined at (i), and
(iii) repeating (i) and (ii) in a time-lapse fashion.

* * * * *